(12) United States Patent
Lewis

(10) Patent No.: US 11,898,907 B1
(45) Date of Patent: Feb. 13, 2024

(54) FREEFORM OFFNER SPECTROMETER

(71) Applicant: Raytheon Company, Waltham, MA (US)

(72) Inventor: Benjamin James Lewis, Redondo Beach, CA (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/948,153

(22) Filed: Sep. 19, 2022

(51) Int. Cl.
| | |
|---|---|
| *G01J 3/28* | (2006.01) |
| *G01J 3/02* | (2006.01) |
| *G01J 3/04* | (2006.01) |
| *G01J 3/18* | (2006.01) |

(52) U.S. Cl.
CPC ............... *G01J 3/0208* (2013.01); *G01J 3/04* (2013.01); *G01J 3/18* (2013.01); *G01J 3/2823* (2013.01)

(58) Field of Classification Search
CPC ........ G01J 3/28; G01J 3/18; G01J 3/14; G01J 3/02; G01J 3/04; G01J 3/44
See application file for complete search history.

(56) References Cited

U.S. PATENT DOCUMENTS

| | | | | |
|---|---|---|---|---|
| 4,743,112 A | * | 5/1988 | Burke | G01J 3/14 356/333 |
| 5,781,290 A | * | 7/1998 | Bittner | G01J 3/14 356/326 |
| 6,288,781 B1 | | 9/2001 | Lobb | |
| 6,628,383 B1 | * | 9/2003 | Hilliard | G01J 3/2823 356/334 |
| 2002/0041445 A1 | | 4/2002 | Nishioka et al. | |
| 2009/0273840 A1 | * | 11/2009 | Mclaughlin | G02B 6/2931 359/569 |
| 2014/0071400 A1 | * | 3/2014 | Gao | G02B 17/0856 351/210 |
| 2019/0384061 A1 | * | 12/2019 | Arora | G02B 27/0172 |

FOREIGN PATENT DOCUMENTS

| | | |
|---|---|---|
| CN | 114280764 A | 4/2022 |
| JP | 2002-107657 A | 4/2002 |
| WO | WO 2016/200816 A1 | 12/2016 |

OTHER PUBLICATIONS

LSST, combined optical surfaces image, https://lsst.org/sites/default/files/photogallery/PPA-full.jpg, Jun. 9, 2022, 1 page, LSST Corporation.

(Continued)

*Primary Examiner* — Abdullahi Nur

(57) ABSTRACT

A spectrometer is configured to form a spectrally resolved image of electromagnetic radiation from an electromagnetic radiation source. The spectrometer can include an optical guide device configured to guide electromagnetic radiation along an optical path. The optical guide device can include a first prism positioned in the optical path. The optical guide device can further include a focusing optic. The first prism can include at least one freeform prism surface that comprises at least some degree of cylindrical curvature having freeform polynomial terms formed thereon, which surface can be a substantially cylindrical, a substantially acylindrical, or a substantially flat surface having freeform polynomial terms formed thereon.

21 Claims, 10 Drawing Sheets

(56) References Cited

OTHER PUBLICATIONS

Nie et al., Design of airborne imaging spectrometer based on curved prism, International Conference on Optical Instruments and Technology: Optical Systems and Modern Optoelectronic Instruments, Nov. 2011, 8 pages, vol. 8197 Proceedings of SPIE.
Tang et al., Improved correction by freeform surfaces in prism spectrometer concepts, Applied Optics, Jan. 2021, pp. 333-341, vol. 60, No. 2, Optica Publishing Group.
Wei et al., Optical design of Offner-Chrisp imaging spectrometer with freeform surfaces, Optical Design and Testing VII, Oct. 2016, 8 pages, vol. 10021, Proceedings of SPIE.
Feng et al., Hyperspectrometer based on curved prism fabrication for space application, Proceedings of SPIE, Jun. 15, 2018, 4 pages, vol. 10692.
Kaiser et al., Compact prism spectrometer of pushbroom type for hyperspectral imaging, Proceedings of SPIE, Sep. 16, 2008, 12 pages, vol. 7100.
International Search Report for International Application No. PCT/US2023/070524 dated Nov. 7, 2023, 14 pages.

\* cited by examiner

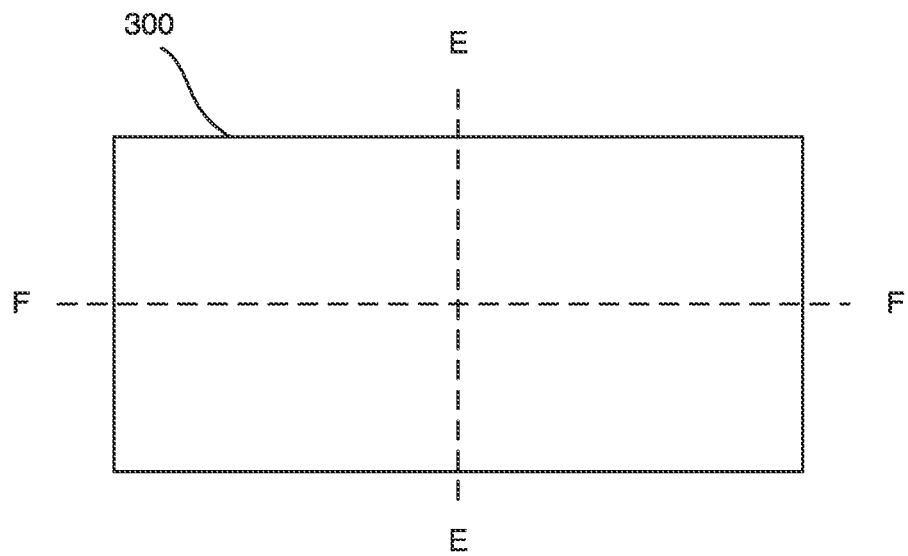
FIG. 3a
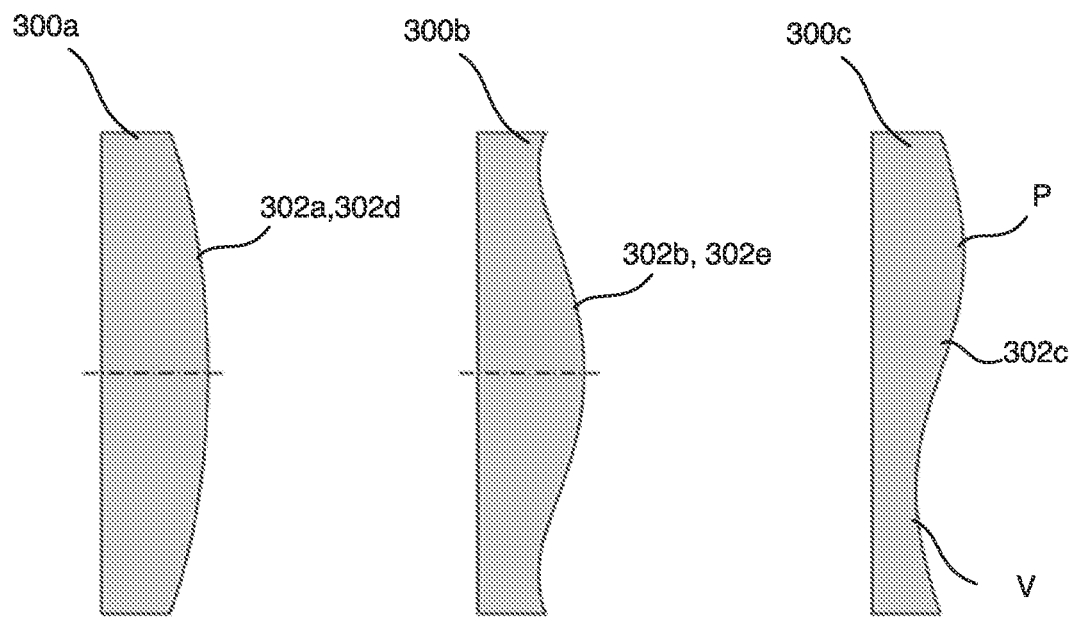
FIG. 3b  FIG. 3c  FIG. 3d

US 11,898,907 B1

FREEFORM OFFNER SPECTROMETER

GOVERNMENT LICENSE RIGHTS

This invention was made with government support under Contract No. 80LARC21DA002 awarded by the NASA. The government has certain rights in the invention.

BACKGROUND

In optical applications, groups and arrangements of prisms, gratings, and/or mirrors are often used to direct, separate, and/or combine electromagnetic radiation in optical systems that serve a variety of different purposes. For example, hyperspectral imaging often uses wide-field spectrometers to obtain, image, and/or analyze spectral components of electromagnetic radiation from an object. Spectrometers direct electromagnetic radiation from an object through an optical system with dispersive elements (e.g., prisms, mirrors, gratings) to split light into different spectral components and to direct the light to a capture sensor configured to image/analyze the spectral components contained in the light from the object. Such analysis can be used to determine characteristics of the object such as chemical make-up and other characteristics.

It is desirable that spectrometers have high quality imaging characteristics to accurately image/analyze spectral components of imaged objects. Image quality, resolution, distortion correction, optical throughput, total dispersion, as well as mass and volume of spectrometers are desirable qualities to optimize in order to produce spectrometers with large, high-resolution, well-corrected image fields. In order to produce spectrometers with improved image quality, distortion correction, throughput and other imaging characteristics, improved designs of optical elements and spectrometers continue to be developed.

BRIEF DESCRIPTION OF THE DRAWINGS

Features and advantages of the present technology will be apparent from the detailed description which follows, taken in conjunction with the accompanying drawings, which together illustrate, by way of example, features of the present technology; and, wherein:

FIG. 3a illustrates a front view of a lens configuration in accordance with an example of the present disclosure.

FIGS. 3b-3d illustrate cross-sectional views of exemplary lenses in accordance with examples of the present disclosure.

Figure 1:
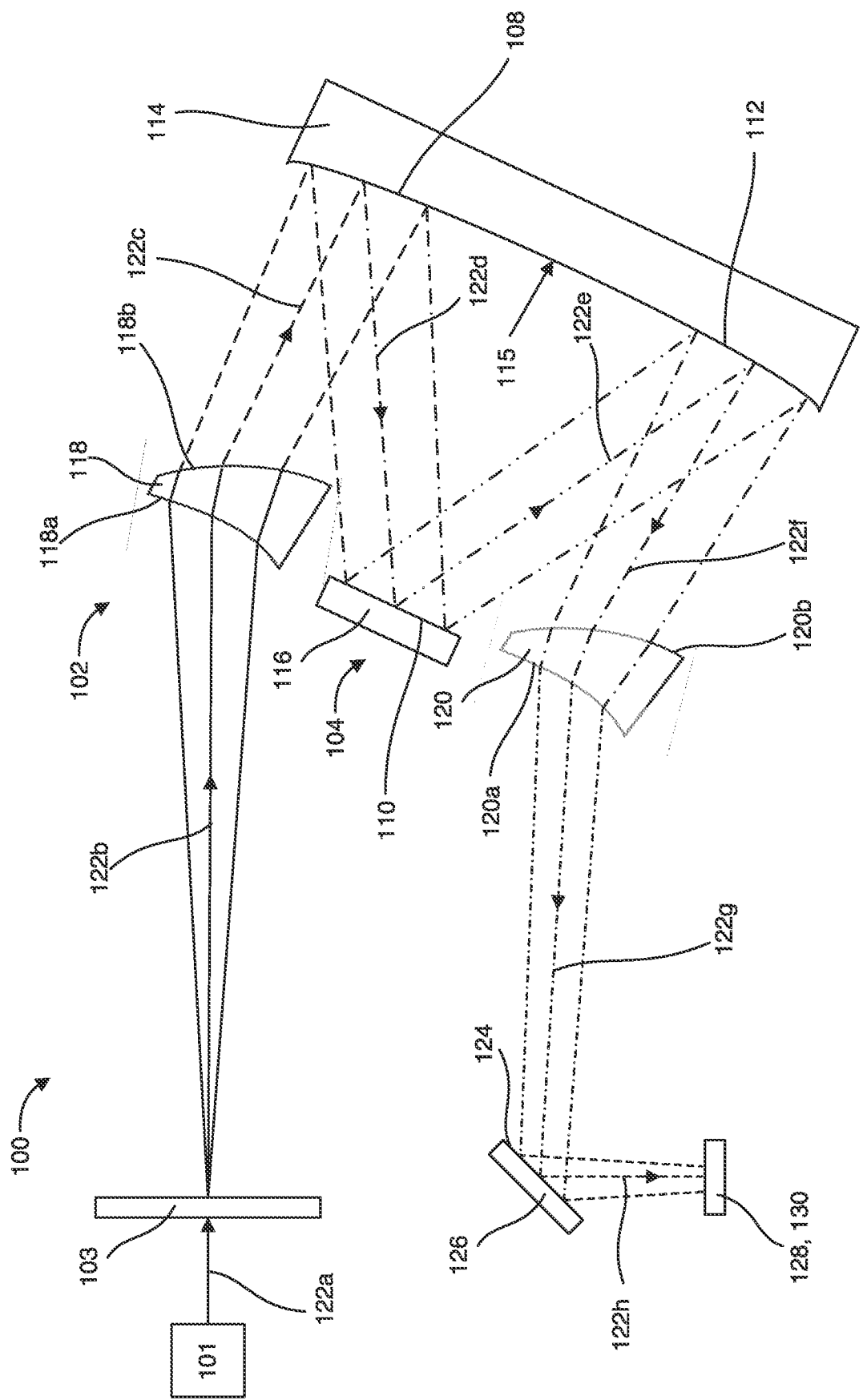
FIG. 1 illustrates schematic diagram of a spectrometer in accordance with an example of the present disclosure.

Reference will now be made to the exemplary embodiments illustrated, and specific language will be used herein to describe the same. It will nevertheless be understood that no limitation of the scope of the present technology is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Disclosed herein is an optical guide device configured to guide electromagnetic radiation along an optical path. The optical guide device can include a first prism positioned in the optical path. The optical guide device can further include a focusing optic positioned in the optical path. The first prism can comprise at least one freeform prism surface.

Further disclosed herein is a spectrometer configured to form a spectrally resolved image of electromagnetic radiation from a source. The spectrometer can include a slit configured to receive electromagnetic radiation. The spectrometer can further include an optical guide device positioned downstream in the optical path from the slit. The optical guide device can be configured to guide electromagnetic radiation along the optical path. The optical guide device can include a first prism positioned in the optical path. The optical guide device can further include a focusing optic positioned in the optical path. The first prism can comprise at least one freeform prism surface having at least some degree of cylindrical curvature having freeform polynomial terms formed thereon. The freeform prism surface can comprise at least one of a cylindrical surface, an acylindrical surface, or a substantially flat surface.

Further disclosed herein is a method of configuring an optical guide device. The method can include a step of configuring the optical guide device to include a first prism in an optical path. The method can further include a step of configuring the optical guide device to include a focusing optic positioned in the optical path. The method can further include a step of configuring the first prism to include at least one freeform prism surface having at least some degree of cylindrical curvature having freeform polynomial terms formed thereon. The freeform prism surface can comprise at least one of a cylindrical surface, an acylindrical surface, or a substantially flat surface.

Further disclosed herein is an optical system. The optical system can include an electromagnetic radiation inlet configured to receive electromagnetic radiation from a source. The optical system can further include an optical guide device configured to guide electromagnetic radiation along an optical path from the electromagnetic radiation inlet to a focal plane. The optical guide device can include a first prism positioned in the optical path. The optical guide device can further include a focusing optic positioned in the optical path. The first prism can comprise at least one freeform prism surface having at least some degree of cylindrical curvature having freeform polynomial terms formed thereon. The freeform prism surface can comprise at least one of a cylindrical surface, an acylindrical surface, or a substantially flat surface.

To further describe the present technology, examples are now provided with reference to the figures. With reference to FIG. 1, illustrated is an optical system in accordance with an example of the present disclosure. The optical system can be a spectrometer 100 that can be operable to gather light from an object 101 for imaging/analysis by the spectrometer 100. The spectrometer 100 can include an optical guide device 102 configured to direct electromagnetic radiation and to split the electromagnetic radiation into various spectral components.

The optical guide device 102 can include a focusing optic 104, which can include a one or more reflecting surfaces. For example, the focusing optic 104 can be configured as an Offner relay including a first reflecting surface 108, a second reflecting surface 110, and a third reflecting surface 112 each configured to receive and reflect electromagnetic radiation in a desired direction. As illustrated in FIG. 1, the first reflecting surface 108 and the third reflecting surface 112 can be formed on a single mirror 114. The first reflecting surface 108 and the third reflecting surface 112, rather than being separate discrete surfaces, can instead each be different sections of a single continuous reflecting surface 115 formed on the mirror 114. In other words, in the spectrometer 100, the first reflecting surface 108 and the third reflecting surface 112 are not separate from each other, meaning that the first reflecting surface 108 and the third reflecting surface 112 are different portions of one single continuous reflecting surface. The first reflecting surface 108 and the third reflecting surface 112 are not separate reflecting surfaces, even if such separate reflecting surfaces are touching or formed on the same substrate. Instead, the first reflecting surface 108 and the third reflecting surface 112 are formed such that there are no breaks in the reflecting surface 115 and no breaks between the first reflecting surface 108 and the third reflecting surface 112. The second reflecting surface 110 can be formed on a second mirror 116 spaced apart from the mirror 114 in a configuration of an Offner relay. Alternatively, the second mirror 116 can be a diffraction grating instead of a mirror. As explained below with respect to FIG. 5, the focusing optic can be a focusing optic other than an Offner relay, such as the Dyson spectrometer shown in FIG. 5.

The optical guide device 102 can further include a first prism 118 including a first surface 118a and a second surface 118b. The optical guide device 102 can further include a second prism 120 including a first surface 120a and a second surface 120b. As illustrated in FIG. 1, the first prism 118 and the second prism 120 can be prisms having one or more faces (e.g., 118a, 118b, 120a, and 120b) configured to collimate, reflect, refract, and/or direct incident light. It is to be appreciated that the one of the first prism 118 or the second prism 120 can be a Fery prism, a standard prism, or otherwise, while the other of the first prism 118 or the second prism 120 can be a same, similar, or different type prism. The standard prism, like the Fery prism, can have surfaces that are flat, spherical, cylindrical, aspherical, acylindrical, or freeform. Any number of additional standard or Fery prisms can be added having surfaces that are flat, spherical, cylindrical, aspherical, acylindrical, and/or freeform.

The optical guide device 102, including the various components thereof (e.g., prism 118, mirror 114, mirror 116, and prism 120) can define an optical path along which electromagnetic radiation is directed. As illustrated in FIG. 1, the optical path can be as follows. Incident light on the first surface 118a of the first prism 118 can pass through the first prism 118 and exit the second surface 118b of the first prism 118. The light from the first prism 118 can be directed toward the first reflecting surface 108 of the focusing optic 104. The first reflecting surface 108 can be disposed downstream in the optical path from the first prism 118 and can reflect light from the first prism 118 toward the second reflecting surface 110 of the focusing optic 104. The second reflecting surface 110 of the focusing optic 104 can direct light toward the third reflecting surface 112 of the focusing optic 104 disposed downstream in the optical path from the second reflecting surface 110. Light incident on the third reflecting surface 112 can reflect toward the second prism 120 positioned downstream in the optical path from the third reflecting surface 112. The light can be incident on the first surface 120a of the second prism 120, can pass through the second prism 120 and exit the second surface 120b of the second prism 120.

The optical guide device 102 can be used as an optical guide device within the spectrometer 100. The spectrometer 100 can further include a slit 103 acting as an electromagnetic radiation inlet through which light 122a from a source or object 101 enters the spectrometer 100. Alternatively, the slit can instead be a beam-slicer. Light 122b from the slit 103 can follow the optical path to the optical guide device 102, specifically the first prism 118. Incident light on the first surface 118a of the first prism 118 can pass through the first prism 118 and exit the second surface 118b of the first prism 118 as light 122c. The light 122c can be directed toward the first reflecting surface 108 of the focusing optic 104 which can reflect light 122c from the first prism 118 as light 122d toward the second reflecting surface 110 of the focusing optic 104. The second reflecting surface 110 of the focusing optic 104 can direct light 122d toward the third reflecting surface 112 disposed downstream in the optical path from the second reflecting surface 110 as light 122e. Light 122e incident on the third reflecting surface 112 can reflect toward the second prism 120 positioned downstream in the optical path from the third reflecting surface 112 as light 122f. The light 122f can be incident on the first surface 120a of the second prism 120, can pass through the second prism 120, and exit the second surface 120b of the second prism 120 as light 122g.

The light 122g can then travel and be incident upon a reflective surface 124 of a reflective-type field corrector 126 (e.g., field flattener) positioned downstream from the second prism 120 and configured to provide correction for incident light 122g in order to ensure a high quality, high resolution, well-corrected field for imaging/analysis by the spectrometer 100. The light 122h reflected by the field corrector 126 can then travel to a focal plane 128 configured to receive the spectrally separated light in a well-corrected field or image. The focal plane 128 can include a capture sensor 130 configured to analyze or capture and image the light for later analysis such as a CCD imaging sensor, a CMOS imaging sensor, or any other sensor or capture device. Devices, sensors, or other objects disposed in the focal plane 128 are not intended to be limited in anyway by this disclosure.

As illustrated in FIG. 1, the spectrometer 100 is a prism-based spectrometer including prisms 118 and 120 and reflecting surfaces 108, 110, and 112. Spectrometers can also be diffraction grating based including diffraction gratings to direct and split light. However, diffraction grating spectrometers suffer from poor light efficiency and require complex order sorting filters that can be difficult to produce. Accordingly, diffraction grating based spectrometers tend to be detrimental to several desirable image quality metrics such as image quality, modulation transfer function (MTF), optical transfer function (OTF), spot size, wave front error, optical throughput, total dispersion, image distortion, and others. In contrast, prism-based spectrometers, such as the spectrometers described herein, offer significant advantages in performance over diffraction grating based spectrometers, including improvements in each of the image quality metrics listed above. Modern optical design, including computer-aided design of lenses, prisms, mirrors, and surfaces thereof, allow for highly specialized and unique surfaces to be manufactured on lenses, mirrors, and prisms to provide precise image correction and high-resolution images from a spectrometer. In other words, the spectrometers described herein provide hyperspectral imaging with a desirably large and well-corrected imaging field.

To provide high quality, large, and well-corrected imaging in a spectrometer, such as spectrometer 100, the optical elements and surfaces thereof can be designed and produced to have unique and highly specialized surfaces. For example, the prisms 118 and 120 can be designed and produced to include one or more freeform surfaces, described in further detail below.

Figure 2A:
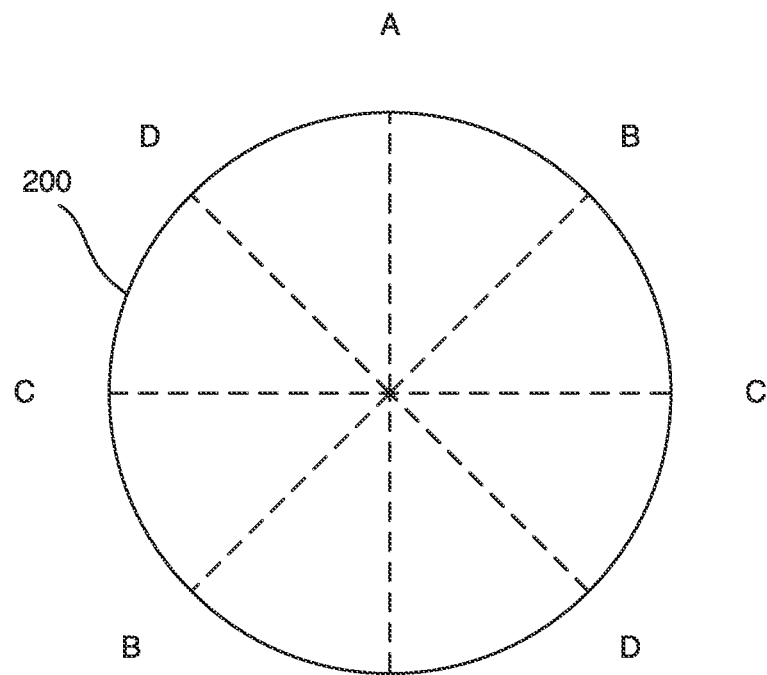
FIG. 2a illustrates a front view of a lens configuration in accordance with an example of the present disclosure.

Surfaces of lenses, mirrors, and prisms can be of several types and designs. In one example, optical elements can be produced with spherical surfaces. FIG. 2a illustrates a front view of an exemplary optical element 200 (e.g., a surface, lens, mirror, or prism) having a round profile. An example spherical surface of optical element 200 is shown in the cross-sectional view of an example optical element 200a shown in FIG. 2b. The cross-section can be taken along any diameter (e.g., line AA, BB, CC, or DD, or any other diameter) of the optical element 200. The spherical surface 202a can be characterized by a radius of curvature being consistent across the entire surface, such that the surface of the optical element 200a is a partial section of a geometric sphere. The spherical surface 202a can exhibit rotational symmetry around the entire surface and can be symmetrical about any diameter of the optical element 200a (e.g., the diameters shown identified in FIG. 2a and any other diameter bisecting the optical element).

Figures 2B, 2C, 2D:
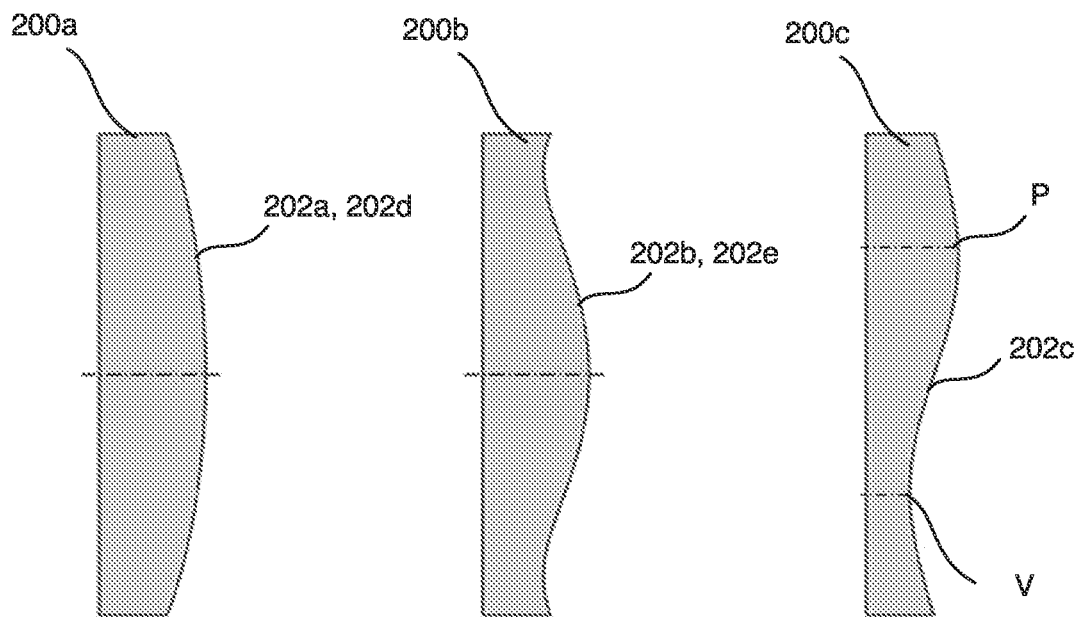
FIGS. 2b-2d illustrate cross-sectional views of exemplary lenses in accordance with examples of the present disclosure.

The optical element 200 can alternatively include an aspherical surface. An example aspherical surface of optical element 200 is shown in the cross-sectional view of an example optical element 200b shown in FIG. 2c. The cross-section can be taken along any diameter (e.g., line AA, BB, CC, or DD, or any other diameter) of the optical element 200. Aspherical surfaces feature a non-spherical and non-cylindrical shape. Unlike spherical surfaces, aspherical surfaces have a radius of curvature that varies from the center of the optical element 200b to the edge of the optical element 200b. However, like spherical surfaces, aspherical surface also exhibit rotational symmetry. As illustrated in FIG. 2c, the aspherical surface 202b can exhibit rotational symmetry around the entire surface and can be symmetrical about any diameter of the optical element 200b (e.g., the diameters shown identified in FIG. 2a and any other diameter bisecting the optical element).

Additionally, it will be appreciated by those skilled in the art that a cylindrical surface 202d can be formed on the optical element 200a having a radius of curvature as shown in FIG. 2b, but lacking rotational symmetry about the entire range of the surface. In other words, cylindrical surfaces of optical elements are characterized by having curvature in one axis (e.g., line AA) and being flat in the orthogonal axis (e.g., line CC). This gives cylindrical optical elements the unique property of acting as a lens or focusing element in a single axis only. Cylindrical lenses form line focii instead of a point. For example, a cylindrical surface 202d can be formed on optical element 200. However, the cylindrical surface may only be symmetric about certain diameters, such as line CC and line AA perpendicular to line CC, while being non-symmetric about line BB and line DD. Similarly, an acylindrical surface 202e can be formed on optical element 200 and can have the same symmetrical relationships of the cylindrical surface about line CC and line AA perpendicular to line CC, while being non-symmetric about line BB and line DD of the optical element 200.

An optical element 200 can be configured as example optical element 200c. As illustrated in FIG. 2d, the optical element 200c can have a freeform surface 202c. In contrast to the aspherical, spherical, cylindrical, and acylindrical surfaces 202a, 202b, 202d, and 202e, a freeform surface 202c can be specifically designed and highly customized to include a curvature with peaks P and valleys V and/or other features formed on the surface that are not symmetric on the surface. In other words, a freeform surface can lack rotational symmetry and can further lack symmetry about any diameters of the optical element 200c. It is to be appreciated that freeform polynomial terms can be formed on surfaces that are substantially spherical, cylindrical, or flat apart from the freeform terms formed on the surfaces.

While an exemplary surface curvature is illustrated in FIG. 2d, it is to be understood that any cross section of an optical element 200c taken along any diameter (e.g., diameters AA, BB, CC, and DD shown in FIG. 2a) can have a different profile than the surface 202c shown in FIG. 2d. With the aid of computer design and manufacturing, freeform surfaces can be formed or imparted on lenses, mirrors, and prisms to provide highly localized and customized features to provide accurate image and light correction in specific and predictable amounts. The use of freeform surfaces allow mirrors, lenses, and/or prisms to be produced with highly specific and uncommon geometries that can be nearly flat, while still providing desired image correction. The freeform surfaces can have geometries that are highly customized and defined by custom tailored polynomial equations (e.g., defining shapes and contours in x, y, z axes) that allow for specifically tailored image correction in very specific areas of the image. Additionally, the highly specialized surface geometries of freeform surfaces can apply very specific amounts of correction to the image without exceeding or undershooting the amount of desired correction. For example, by allowing odd-polynomial terms, such as a cubic term or a quintic term, and specialized shapes on prism, lens, or mirror surfaces, image problems, such as coma, can be corrected without inducing astigmatism or anamorphic distortion. In other words, near-flat freeform surfaces can allow multiple imaging aberrations and distortions, even of very minor amounts, to be corrected without introducing further undesirable image distortion.

Similar to the round optical element example of FIG. 2a, other optical elements can also be produced with a variety of different surfaces. For example a front view of an optical element 300 having a rectangular or square profile is illustrated in FIG. 3a. Similar to the optical element 200, the optical element 300 can be formed with any of a spherical 302a, aspherical 302b, cylindrical 302d, and acylindrical 302e surfaces with symmetry about lines EE and FF. Cylindrical surfaces of optical elements are characterized by having curvature in one axis (e.g., line EE) and being flat in the orthogonal axis (e.g., line FF). This gives cylindrical optical elements the unique property of acting as a lens or focusing element in a single axis only. Cylindrical lenses form line focii instead of a point.

Also similar to the optical element 200, the optical element 300 can be formed to have a freeform surface 302c. In contrast to the aspherical, spherical, cylindrical, and acylindrical surfaces 302a, 302b, 302d, and 302e shown in FIGS. 3B and 3C, respectively, a freeform surface 302c can be specifically designed and highly customized on the optical element 300 to include a curvature with peaks P and valleys V and/or other features formed on the surface that are not symmetric on the surface about line EE or line FF. In other words, the freeform surface 302c can lack rotational symmetry and can further lack symmetry about bisecting lines of the optical element 300. While an exemplary surface curvature is illustrated in FIG. 3d, it is to be understood that any cross section of an optical element 300 taken along any line cut through optical element 300 can have a different profile than the surface 302c shown in FIG. 3d.

With the aid of computer design and manufacturing, freeform surfaces can be formed or imparted on lenses, mirrors, and prisms to provide highly localized and customized features to provide accurate image and light correction in specific and predictable amounts. The use of freeform surfaces allows mirrors, lenses, and/or prisms to be produced with specific geometries that can be nearly flat, while still providing desired image correction. For example, by allowing odd-polynomial terms and specialized shapes on prism, lens, or mirror surfaces, image problems such as coma can be corrected without inducing astigmatism or anamorphic distortion. In other words, near-flat freeform surfaces can allow multiple imaging aberrations and distortions to be corrected without introducing further undesirable image distortion.

It is to be appreciated that freeform polynomial terms and shapes can be formed on surfaces that are substantially spherical, cylindrical, or flat apart from the freeform terms formed on the surfaces. For example, FIGS. 3e-3i illustrate freeform portions on lenses having shapes corresponding to substantially spherical, cylindrical, or flat shapes. For example, FIG. 3e illustrates a cross-section of a substantially spherical lens 310a taken along an axis of the lens (e.g., line EE of FIG. 3a). FIG. 3f illustrates a cross-section of a substantially spherical lens 310a taken along an orthogonal axis of the lens (e.g., line FF of FIG. 3a). It is to be appreciated that, in the case of the substantially spherical lens 310a the lens would substantially exhibit a same radius of curvature anywhere along a spherical profile of the lens 310a. As illustrated, the lens 310a can comprise a substantially spherical shape 312a over the lens 310a and the freeform portions 314a or freeform polynomials are formed on the substantial spherical shape 312a of the lens 310a FIG. 3g illustrates a cross-section of a substantially cylindrical lens 310b taken along an axis of the lens (e.g., line EE of FIG. 3a). FIG. 3h illustrates a cross-section of a substantially spherical lens 310b taken along an orthogonal axis of the lens (e.g., line FF of FIG. 3a). As illustrated in FIG. 3g, the substantially cylindrical lens 310b can exhibit a radius of curvature only along one axis (e.g., line EE of FIG. 3a) of the lens 310b as shown in FIG. 3g while an orthogonal axis (e.g., line FF of FIG. 3a) has substantially no curvature as shown in FIG. 3h. As illustrated, the lens 310a can comprise a substantially cylindrical shape 312b over the lens 310b and the freeform portions 314b or freeform polynomials can be formed on the substantial cylindrical shape 312b of the lens 310b.

Figure 3I:
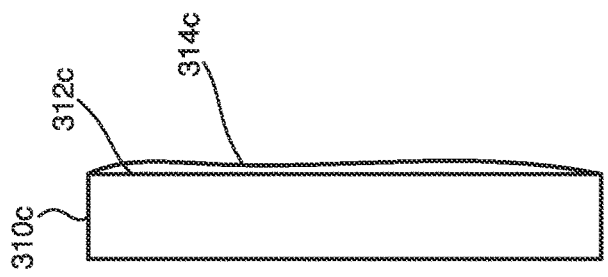
FIGS. 3e-3i illustrate cross-sectional views of exemplary lenses having freeform features formed thereon in accordance with examples of the present disclosure.
Figure 3H:
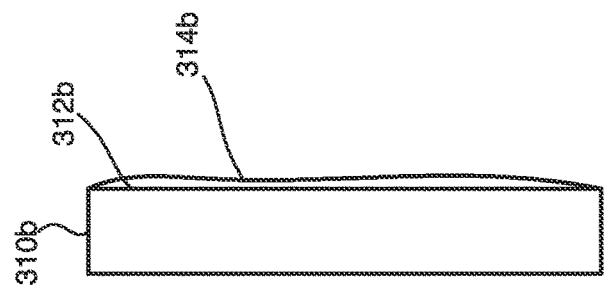
Figure 3G:
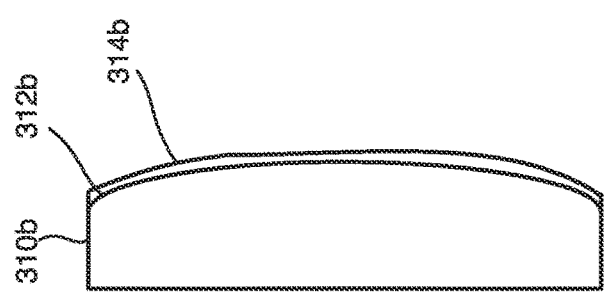
Figure 3F:
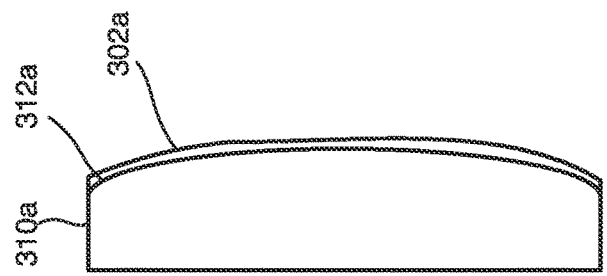
Figure 3E:
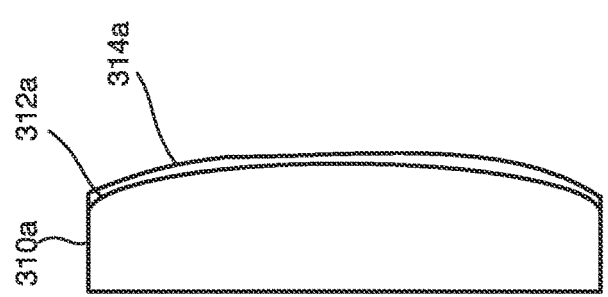

Furthermore, FIG. 3i illustrates a cross-section of a substantially flat lens 310c. As illustrated in FIG. 3i, the substantially flat lens 310c can exhibit substantially no curvature as shown in FIG. 3i along the flat shape 312c of the lens 310c. As illustrated, the lens 310c can comprise a substantially flat shape 312c over the lens 310b and the freeform portions 314c or freeform polynomials can be formed on the substantial flat shape 312c of the lens 310c. Although the flat shape 312c, the cylindrical shape 312b, and the spherical shape 312a are shown as discrete layers or surfaces in the figures, it is to be understood that the shapes 312a-c are merely meant to indicate the substantial general shape of the lens and are not meant to indicate a separate surface or layer of the lenses. Instead, it is to be understood that the freeform portions 314a-c can be formed on a lens of any shape.

In the spectrometers 100/400, optical guide devices 102/402, and focusing optics 104/404 described herein, the freeform surfaces can be formed to be very nearly flat, with only very minor changes in peaks or valleys in the surface due to polynomial terms in the equations defining the freeform surfaces. In such freeform surfaces of the current disclosure, most or all of the correction to an image can come from the freeform polynomial terms, not from any radius of curvature of any elements. For example, the prisms 118 and 120 can be Fery prisms having a radius of curvature, as is common in Fery prisms. However, instead of comprising spherical surfaces, in other words the one or more freeform surfaces are not spherical surfaces, it will be appreciated that the prisms described herein, including possibly Fery prisms, and used in spectrometers designed in accordance with the principles of this disclosure, can have substantially cylindrical surfaces or acylindrical surfaces in which the surfaces are characterized by having at least some degree of cylindrical curvature in one axis (e.g., line EE) and being flat in the orthogonal axis (e.g., line FF) to form a line focii instead of a point.

The freeform surfaces of prisms 118 and 120 can be formed on one or more surfaces, such as a substantially flat surface (i.e., the surface is not flat or planar, but comprises some slight degree of cylindrical or acylindrical curvature (near zero)), a cylindrical surface, or an acylindrical surface of the prisms 118 and 120, such that the correction to the image comes from the freeform terms, not the radius of curvature of the prisms 118 and 120 (which is typical in Fery prisms with spherical surfaces. Similarly, for surfaces of the mirror 114, second mirror 116, field corrector 126, surface 408, and surface 412, freeform surfaces can be formed thereon to ensure that most or all of the correction to the image is carried out by the freeform polynomial terms, not any curvatures or radii of the respective elements.

According to the principles described herein, one or more of the prisms 118 and 120 can have one or more freeform surfaces that are substantially cylindrical, substantially acylindrical, or substantially flat having freeform polynomial terms formed thereon, as opposed to having spherical surfaces with freeform polynomial terms formed thereon, in order to improve the image correction in the Offner spectrometer. More than one surface of the prisms can comprise the substantially cylindrical, substantially acylindrical, or substantially flat having freeform polynomial terms thereon, but it is not required that every prism include one or more such surfaces. The shapes and configurations of surfaces of the prisms that do not have freeform polynomial terms formed thereon are not particularly intended to be limited by this disclosure but can instead be of any shape or configuration.

Figure 7A:
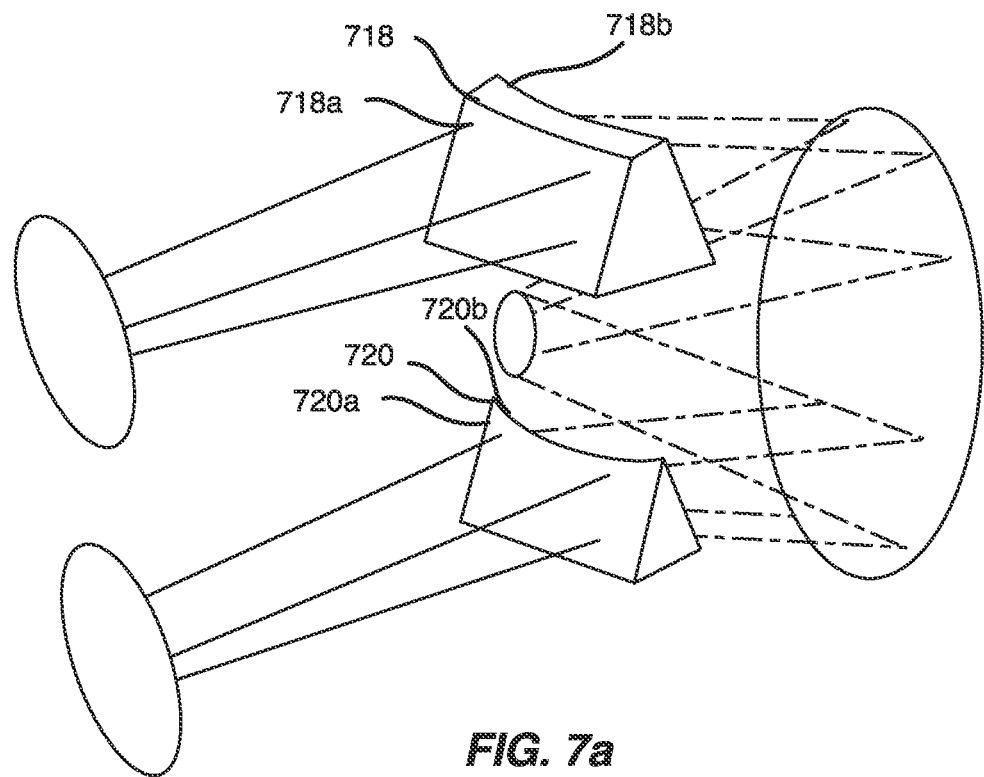
FIG. 7a illustrates a Fery spectrometer.
Figure 7B:
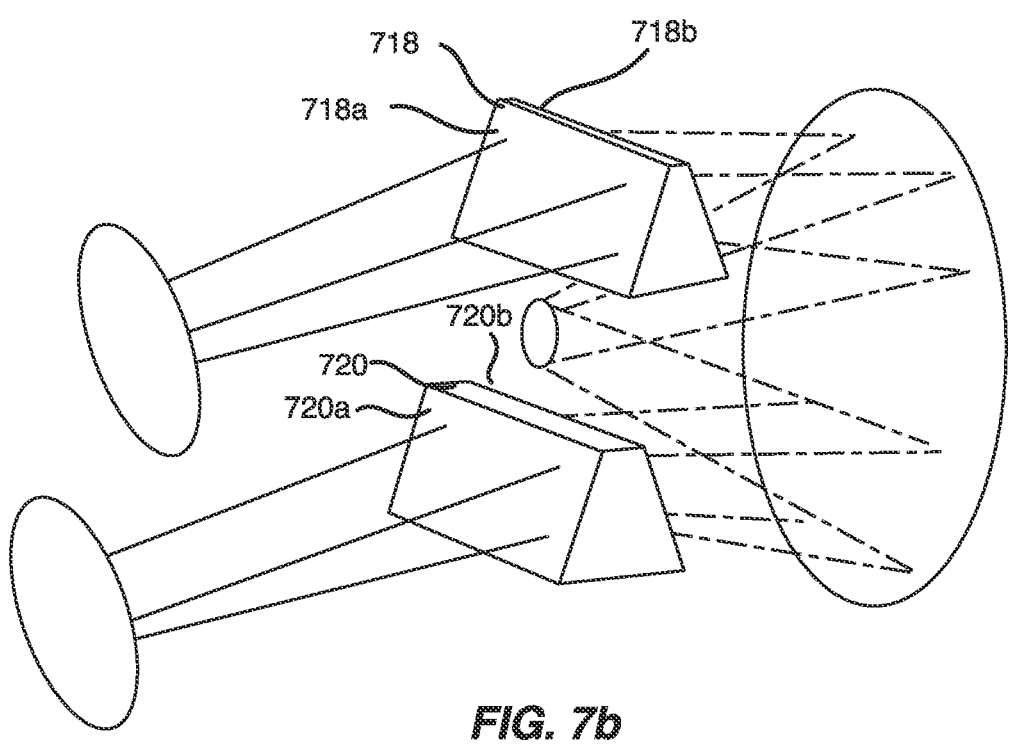
FIG. 7b illustrates a Freeform spectrometer.

Accordingly, to improve imaging and light direction within spectrometers 100, freeform surfaces (e.g., substantially cylindrical, substantially acylindrical, or substantially flat having freeform polynomial terms formed thereon) can be formed on the prisms 118 and 120 in order to improve image quality and correct image distortions and aberrations and to provide highly corrected images from the spectrometer. An example quantifying experimental data gathered of the improved image quality and the corrected image distortions of the spectrometers disclosed herein are discussed. In the said example, an Offner spectrometer having Fery prisms with spherical surfaces ("Fery Offner") is compared to an Offner spectrometer of the kind shown in FIG. 1, wherein the Fery prisms have freeform surfaces formed thereon ("Freeform Offner"). An example of the Fery Offner is illustrated in FIG. 7a, showing Fery prisms 718 and 720 having spherical surfaces 718a, 718b, 720a, and 720b. An example of the Freeform Offner is illustrated in FIG. 7b, showing freeform prisms 728 and 730, in accordance with the principles of the present disclosure, where each prism has one face of the XY-polynomial type, and one face which is flat (piano).

Both the Fery Offner and the Freeform Offner use a combined first reflecting surface 108 and third reflecting surface 112 formed on a single mirror 114 as a continuous freeform surface described herein. Both designs were made to cover a 40 mm field of view at an f-number of f/7.7 and covering a spectrum from 400 nm to 700 nm. In the Freeform Offner spectrometer, the spectrometer was designed such that each Fery prism (e.g., 118 and 120) has one surface (e.g., 118a or 118b, and 120a or 120b) being an XY-polynomial type freeform surface, and one surface (e.g., the other of 118a or 118b, and the other of 120a or 120b) which is flat (piano).

Figure 8A:
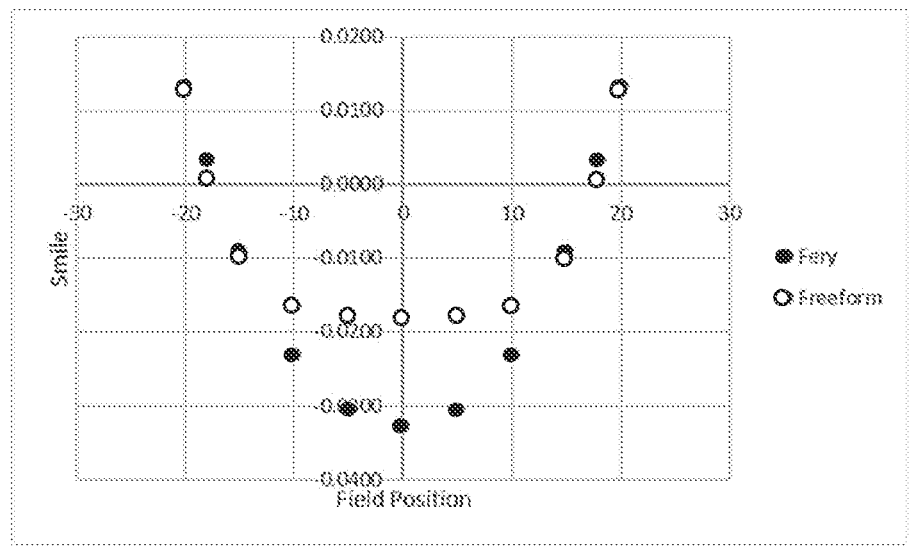
FIGS. 8a-9b illustrate various experimental results comparing distortion in a Fery spectrometer to distortion in a Freeform spectrometer.
Figure 8B:
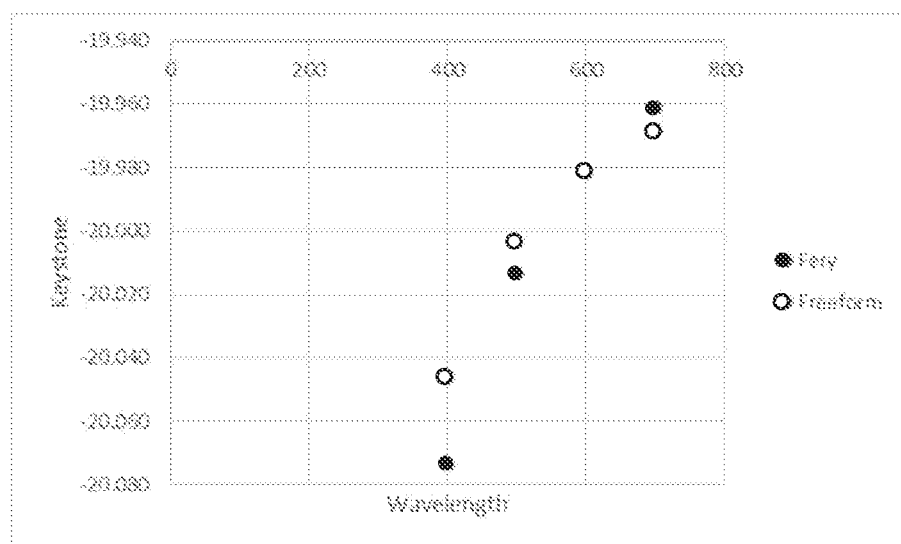
Figure 9A:
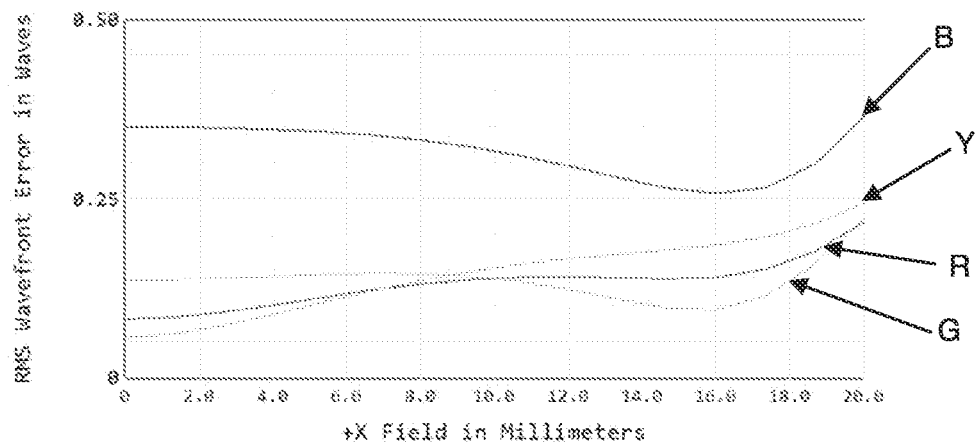
Figure 9B:
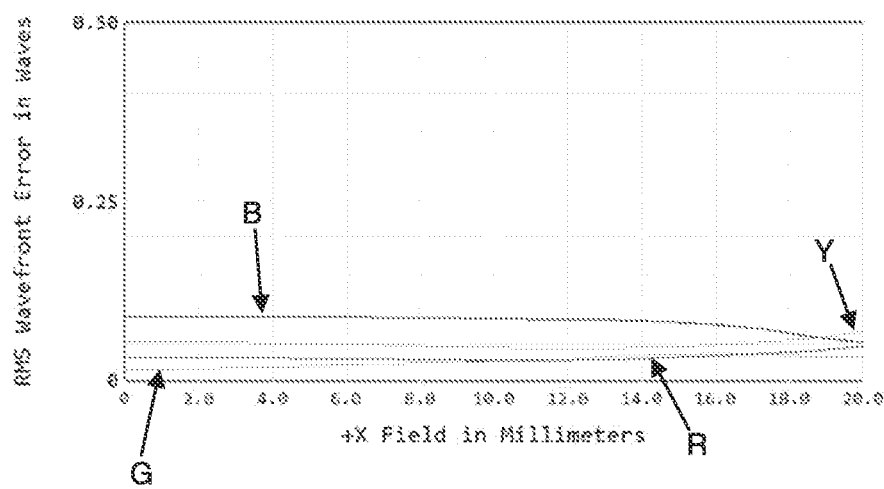

Results from experimental data on both the Fery Offner and the Freeform Offner are as follows. When compared to the Fery Offner, the Freeform Offner provides 3.5 times better wavefront error correction, 33% better smile distortion correction, 30% better keystone distortion correction, and less than 1% anamorphic distortion, versus 8% for the Fery Offner. FIGS. 8A-9B illustrate results of various distortions and errors of the Fery Offner compared to the Freeform Offner. FIG. 8a illustrates smile distortion exhibited in the Freeform Offner compared to the Fery Offner. FIG. 8b illustrates keystone distortion exhibited in the Freeform Offner compared to the Fery Offner. FIG. 9a illustrates wavefront error exhibited in red, green, yellow, and blue wavelengths in the Fery Offner. FIG. 9b illustrates wavefront error exhibited in red, green, yellow, and blue wavelengths in the Freeform Offner.

It is to be understood that the spectrometer and optical devices of the disclosure are not limited to the configuration of the Freeform Offner described in the experimental results above. Other configurations are possible and contemplated within the principles of this disclosure. One or more of the surfaces 118a and 118b of the first prism 118 can be formed as freeform surfaces (e.g., substantially cylindrical, substantially acylindrical, or substantially flat having freeform polynomial terms formed thereon) in order to provide correction to light traveling in the spectrometer. Similarly, one or more of the surfaces 120a and 120b of the second prism 120 can be formed as freeform surfaces (e.g., substantially cylindrical, substantially acylindrical, or substantially flat having freeform polynomial terms formed thereon) in order to provide further correction to light traveling in the spectrometer. According to the disclosure above, the first prism 118 and the second prism 120 can be Fery prisms having one or more freeform surfaces (e.g., substantially cylindrical, substantially acylindrical, or substantially flat having freeform polynomial terms formed thereon) formed thereon. Additionally, only one of the Fery prisms of the first prism 118 and the second prism 120 may have a single freeform surface while the other prism has no freeform surfaces. It will be appreciated that only one freeform surface on one of the prisms may be used to achieve the benefits of the present disclosure to limit complexity of manufacturing. However, more freeform surfaces in any number may be formed on the surfaces of any number of prisms if desired to achieve the benefits of the disclosure.

A freeform surface can also be formed on the mirror 114. As illustrated in FIG. 1, the mirror 114 can be a single mirror 114 comprising a single continuous freeform surface 115. Having the single continuous freeform surface 115, the mirror 114 can be surfaced to include two different portions of the single continuous freeform surface 115 (e.g., first reflecting surface 108 being one portion of the continuous freeform surface 115 and the third reflecting surface 112 being another portion of the continuous freeform surface 115). This is in contrast to certain Offner relay imaging systems in which the first and third reflecting surfaces are separate discrete surfaces, even if such discrete surfaces are formed on a common substrate or even if such discrete surfaces are touching each other. The first reflecting surface 108 can be a freeform surface configured to reflect light to surface 110 of mirror 116 and the third reflecting surface 112 can be a freeform surface configured to receive light from the mirror 116 and to reflect light to the second prism 120.

Forming a single continuous freeform reflection surface 115 to function as both the first reflecting surface 108 and the third reflecting surface 112 provides advantages over the previous separate reflecting surfaces in Offner relays. For example, a single reflecting surface limits the amount of adjustment and movement that can happen between the first reflecting surface 108 and the third reflecting surface 112, thereby allowing the first and third reflecting surfaces to be positioned correctly relative to each other with less chance for misalignment. This is accomplished by producing both the first and third reflecting surfaces 108 and 112 as a single surface. By being produced as a single surface, the first and third reflecting surfaces 108 and 112 are definitionally aligned and in fixed positions relative to each other by being part of the same singular surface. Being thus fixed relative to each other, the first and third reflecting surfaces 108 and 112 cannot be misaligned, because they are formed from a single piece of glass or metal. In other words, the first and third reflecting surfaces 108 and 112, during fabrication, can be produced as a single large mirror, instead of two smaller ones. Additionally, one single mirror can be formed to provide the functions of both the first and third reflecting surfaces, thereby simplifying and minimizing manufacturing processes for producing mirrors and reflecting surfaces of a spectrometer.

The surface 110 of the mirror 116 is not intended to be limited in anyway by this disclosure. The reflective surface 110 of the mirror 116 can be any type of surface without limitation including, spherical, aspherical, cylindrical, acylindrical, freeform, or others.

As further illustrated in FIG. 1, the spectrometer 100 can include a reflective-type field corrector 126 positioned downstream from the second prism 120 and configured to provide correction for incident light 122g and to reflect light toward a focal plane 128. The reflective surface 124 of the reflective-type field corrector 126 can be any type of surface without limitation including, spherical, aspherical, cylindrical, acylindrical, or freeform. The reflective-type field corrector 126 can be a folded optic component such as a fold mirror. The field corrector 126 can correct residual field aberrations, also known as aberrations that vary over the field of view, including curvature, field dependent astigmatism, and/or others.

From the above disclosure, it will be appreciated that any combination of surfaces included in the spectrometer 100, focusing optic 104, and optical guide device 102 can be freeform surfaces (e.g., substantially cylindrical, substantially acylindrical, or substantially flat having freeform polynomial terms formed thereon). For example, any of the elements in the optical guide device can include one or more freeform surfaces.

In a first example, only the first prism 118 of spectrometer 100, focusing optic 104, and optical guide device 102 has one or more freeform surfaces (e.g., substantially cylindrical, substantially acylindrical, or substantially flat having freeform polynomial terms formed thereon). The first surface 118a can be the freeform prism surface, or the second surface 118b can be a freeform surface, or both surfaces 118a and 118b can be freeform surfaces.

In a second example, only the second prism 120 of spectrometer 100, focusing optic 104, and optical guide device 102 has one or more freeform surfaces. The first surface 120a can be the freeform prism surface, or the second surface 120b can be a freeform surface, or both surfaces 120a and 120b can be freeform surfaces.

In a third example, only the mirror 114 of spectrometer 100, focusing optic 104, and optical guide device 102 has one or more freeform surfaces. The first reflecting surface 108 can be the freeform surface, or the third reflecting surface 112 can be the freeform surface, or both reflecting surfaces 108 and 112 can be freeform surfaces. Additionally, reflecting surfaces 108 and 112 can be formed of a single continuous freeform reflecting surface as described elsewhere herein.

In another example, a surface 110 of second mirror 116 can be a freeform surface. In another example a surface 124 of field corrector 126 can be a freeform surface.

It will be understood by the disclosure, that any and all combinations of surfaces described and illustrated in the spectrometer 100, the focusing optic 104, and the optical guide device 102 can be freeform surfaces without limitation as long as at least one freeform surface is included in one or more elements of the spectrometer 100, the focusing optic 104, and/or the optical guide device 102.

Figure 4:
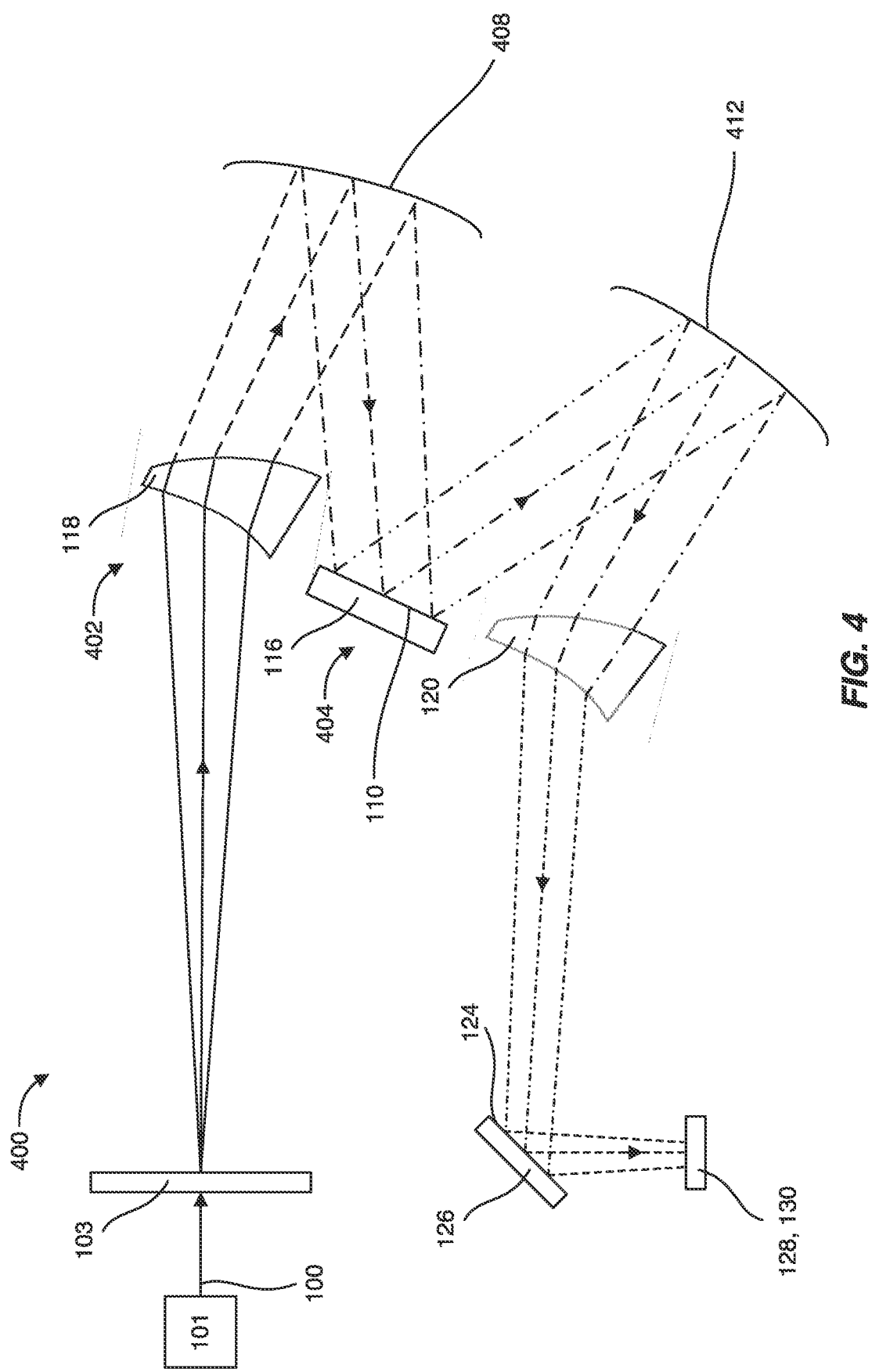
FIG. 4 illustrates schematic diagram of a spectrometer in accordance with an example of the present disclosure.

An alternative configuration of a spectrometer 400 is illustrated in FIG. 4. Elements having the same configuration and function as in the spectrometer 100 will be labeled in FIG. 4 with the same numbers used in FIG. 1 for the same respective elements. As shown in FIG. 4, an optical guide device 402 and a focusing optic 404 can be changed with respect to the optical guide device 102 and the focusing optic 104 by using two discrete reflecting surfaces/mirrors for the first reflecting surface 408 and the third reflecting surface 412. Although two discrete reflecting surfaces 408 and 412 are used in place of the single continuous reflecting surface 115, the optical path and function of the respective spectrometer 400, optical guide device 402, and focusing optic 404 can remain the same. However, the first reflecting surface 408 and the third reflecting surface 412 can be separate in the exemplary spectrometer 400 in order to provide adjustability between alignment and angles of the first reflecting surface 408 and the third reflecting surface 412.

From the above disclosure, it will be appreciated that any combination of surfaces included in the spectrometer 400, focusing optic 404, and optical guide device 402 can be freeform surfaces. For example, any of the elements in the optical guide device can include one or more freeform surfaces.

In a first example, only the first prism 118 of spectrometer 400, focusing optic 404, and optical guide device 402 has one or more freeform surfaces. The first surface 118a can be the freeform prism surface, or the second surface 118b can be a freeform surface, or both surfaces 118a and 118b can be freeform surfaces.

In a second example, only the second prism 120 of spectrometer 400, focusing optic 404, and optical guide device 402 has one or more freeform surfaces. The first surface 120a can be the freeform prism surface, or the second surface 120b can be a freeform surface, or both surfaces 120a and 120b can be freeform surfaces.

In a third example, only the first reflecting surface 408 of spectrometer 400, focusing optic 404, and optical guide device 402 has one or more freeform surfaces. The first reflecting surface 408 can be the freeform surface. Alternatively, only the third reflecting surface 412 can be the freeform surface. Alternatively, both reflecting surfaces 408 and 412 can be freeform surfaces.

In another example, a surface 110 of second mirror 116 can be a freeform surface. In another example a surface 124 of field corrector 126 can be a freeform surface. It will be understood by the disclosure, that any and all combinations of surfaces described and illustrated in the spectrometer 400, the focusing optic 404, and the optical guide device 402 can be freeform surfaces without limitation as long as at least one freeform surface is included in one or more elements of the spectrometer 400, the focusing optic 404, and/or the optical guide device 402.

While the examples above have been specifically directed to spectrometers, it is to be understood that the focusing optic (e.g., focusing optic 104 and focusing optic 404) and optical guide devices (e.g., device 102 and 402) described herein can be utilized in any other appropriate optical system without limitation. Any optical system used to receive and direct electromagnetic radiation can incorporate the focusing optic (e.g., focusing optic 104 and focusing optic 404) and optical guide devices (e.g., device 102 and 402) according to the principles described herein.

The examples of the spectrometers, focusing optics, Offner relays, and optical guide devices described herein provide numerous advantages and benefits. For example, computer-aided design of prism optical surfaces allows for specific and specialized shapes to be imparted to freeform surfaces of optical elements. Such specific and specialized freeform surfaces can be used in one or more of the optical components (e.g., prism 118, prism 120, reflecting surface 108, reflecting surface 112, reflecting surface 115, reflecting surface 110, field corrector 126). Having been precisely designed using computer-aided design and manufacturing allows for specialized and specifically designed surfaces to be manufactured on optical elements to correct specific aberrations and distortions in images and electromagnetic radiation that were previously difficult to correct. The use of the specialized surface designed with computer-aided design tools allows the specific aberrations to be corrected with precision. Thus, the principles described herein can result in relays, optical guide devices, optical systems, and spectrometers with well-corrected, high-resolution imaging fields.

Figure 5:
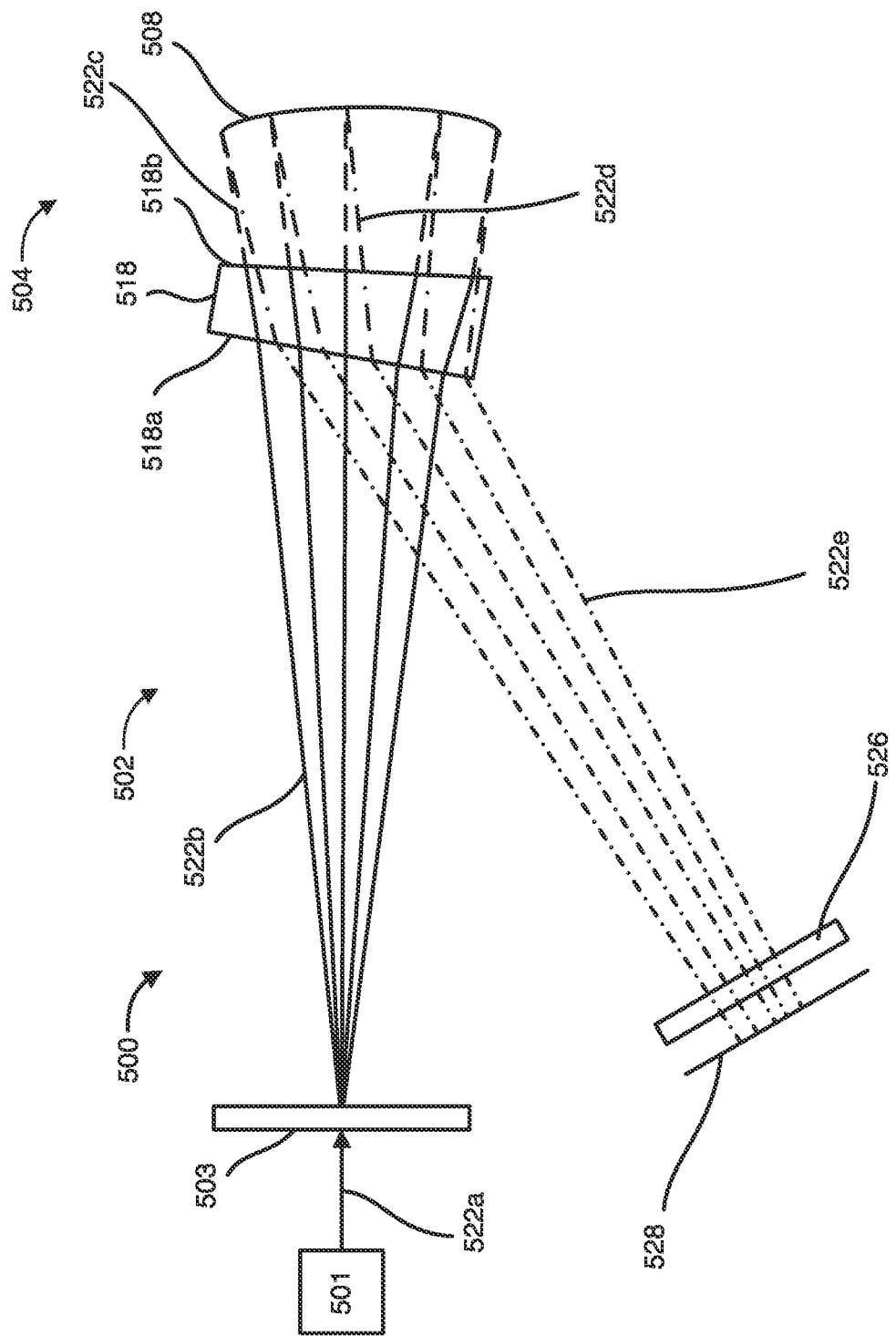
FIG. 5 illustrates schematic diagram of a spectrometer in accordance with an example of the present disclosure.

The discussion above is largely directed to Offner spectrometers including an Offner relay as a focusing optic. However, other focusing optics, designed in accordance with the principles discussed herein, can be used in spectrometers, while the benefits and advantages described above. For example, FIG. 5 illustrates another optical system in accordance with an example of the present disclosure. The optical system can be a spectrometer 500 that can be operable to gather light from an object 501 for imaging/analysis by the spectrometer 500. The spectrometer 500 can include an optical guide device 502 configured to direct electromagnetic radiation and to split the electromagnetic radiation into various spectral components.

The optical guide device 502 can include a focusing optic 504, which can include a one or more reflecting surfaces. In this example, the focusing optic 504 can be configured as a relay to make the spectrometer 500 a Dyson spectrometer. The focusing optic 504 in such example can include a first reflecting surface 508 configured to receive and reflect electromagnetic radiation in a desired direction.

The optical guide device 502 can further include a prism 518 including a first surface 518a and a second surface 518b configured to collimate, reflect, refract, and/or direct incident light. The optical guide device 502, including the various components thereof (e.g., prism 518 and reflecting surface 508) can define an optical path along which electromagnetic radiation is directed. As illustrated in FIG. 5, the optical path can be as follows. Incident light on the first surface 518a of the prism 518 can pass through the prism 518 and exit the second surface 518b of the prism 518. The light from the first prism 518 can be directed toward the first reflecting surface 508 of the focusing optic 504. The first reflecting surface 508 can be disposed downstream in the optical path from the prism 518 and can reflect light from the first prism 518 back toward the first prism 518 of the focusing optic 504. The light from the reflecting surface 508 can be directed toward the second surface 518b of the prism 518. The incident light on the second surface 518b can pass through the prism 518 and exit the prism 518 out of the first surface 518a.

The optical guide device 502 can be used as an optical guide device within the spectrometer 500. The spectrometer 500 can further include a slit 503 acting as an electromagnetic radiation inlet through which light 522a from a source or object 501 enters the spectrometer 500. Alternatively, the slit can instead be a beam-slicer. Light 522b from the slit 103 can follow the optical path to the optical guide device 502, specifically the prism 518. Incident light on the first surface 518a of the prism 518 can pass through the first prism 518 and exit the second surface 518b of the prism 518 as light 522c. The light 522c can be directed toward the reflecting surface 508 of the focusing optic 504 which can reflect light 522c from the prism 518 as light 522d back toward the second surface 518b of the prism 518. The light 522d can pass through the prism 518 and exit the first surface 518a of the prism 518 as light 522e. Light 522e can then travel and be either incident upon or pass through a field corrector 526 (e.g., field flattener) positioned downstream from the prism 518 and configured to provide correction for incident light 522e in order to ensure a high quality, high resolution, well-corrected field for imaging/analysis by the spectrometer 500. Subsequently or alternatively, the light 522e can travel to a focal plane 528 configured to receive the spectrally separated light in a well-corrected field or image. The focal plane 528 can include a capture sensor configured to analyze or capture and image the light for later analysis such as a CCD imaging sensor, a CMOS imaging sensor, or any other sensor or capture device. Devices, sensors, or other objects disposed in the focal plane 528 are not intended to be limited in anyway by this disclosure.

As illustrated in FIG. 5, the spectrometer 100 is a prism-based spectrometer including prism 518 and reflecting surface 508. Modern optical design, including computer-aided design of lenses, prisms, mirrors, and surfaces thereof, allow for specialized and unique surfaces to be manufactured on lenses, mirrors, and prisms to provide precise image correction and high-resolution images from a spectrometer. Similar to the prisms described in spectrometer 100, the prism 518 can be formed with a freeform surface. One or more of surfaces 518a and 518b can be freeform surfaces that provide correction of the incident light as described elsewhere in this disclosure. One surface (either 518a or 518b) of the prism 518 can be freeform while the other surface (the surface of either 518a or 518b that is not freeform) can be flat. Alternatively, both surfaces 518a and 518b can be freeform surfaces if desired. The freeform surface(s) of the prism 518 can be specifically designed to provide correction at a specific amount of specific aberrations in incident light, just as described above with respect to spectrometer 100.

Figure 6:
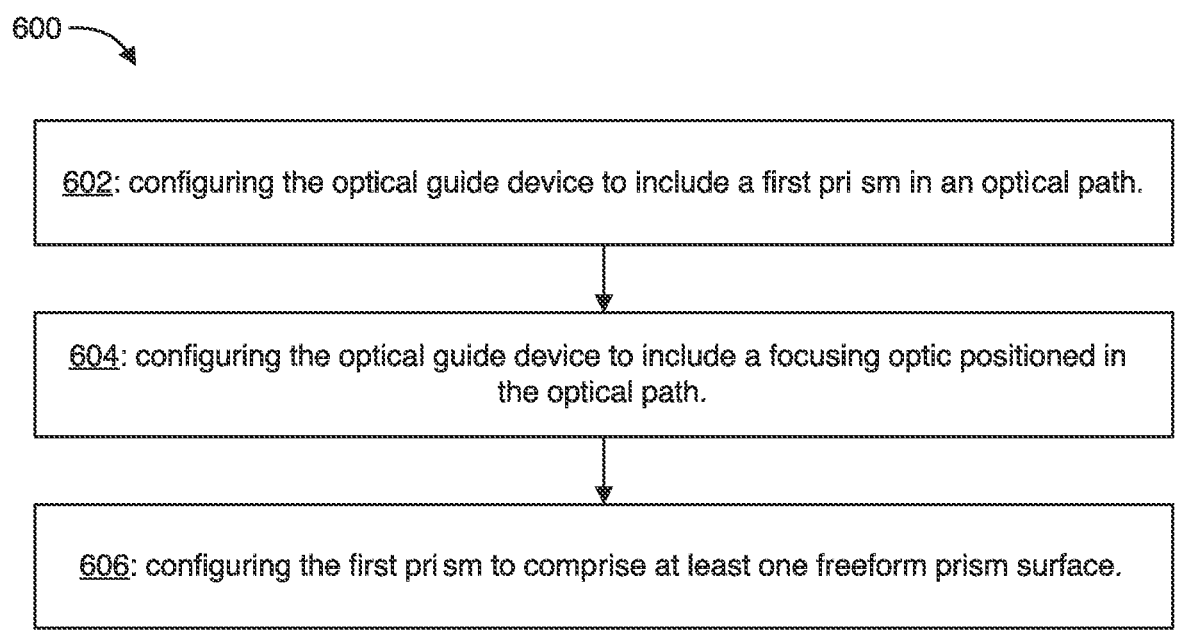
FIG. 6 illustrates a method of configuring an optical guide device in accordance with an example of the present disclosure.

Described further herein is a method 600, illustrated in FIG. 6, of configuring an optical guide device. The method 600 can include a step 602 of configuring the optical guide device to include a first prism in an optical path. The method 600 can further include a step 604 of configuring the optical guide device to include a focusing optic in the optical path from the first prism. The method 600 can further include a step 606 of configuring the first prism to comprise at least one freeform prism surface. These methods can be carried out by the spectrometers discussed herein.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein can be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics can be combined in any suitable manner in one or more examples. In the preceding description, numerous specific details were provided, such as examples of various configurations to provide a thorough understanding of examples of the described technology. It will be recognized, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. An optical guide device configured to guide electromagnetic radiation along an optical path, the optical guide device comprising:
   a first prism positioned in the optical path; and
   a focusing optic positioned in the optical path;
   wherein the first prism comprises at least one freeform prism surface having at least some degree of cylindrical curvature, and having freeform polynomial terms formed thereon.

2. The optical guide device of claim 1, further comprising:
   a second prism positioned downstream in the optical path from the first prism.

3. The optical guide device of claim 2, wherein the focusing optic is positioned downstream in the optical path from the first prism and upstream in the optical path from the second prism.

4. The optical guide device of claim 2, wherein one or more of the first and second prisms are Fery prisms.

5. The optical guide device of claim 2, wherein the second prism comprises at least one freeform prism surface.

6. The optical guide device of claim 2, wherein one or more of the first prism and the second prism comprises at least two freeform prism surfaces.

7. The optical guide device of claim 1, wherein the focusing optic is positioned either downstream or upstream in the optical path from the first prism.

8. The optical guide device of claim 1, wherein the focusing optic comprises:
   a first reflecting surface positioned in the optical path;
   a second reflecting surface positioned in the optical path downstream from the first reflecting surface;
   a third reflecting surface positioned in the optical path downstream from the second reflecting surface.

9. The optical guide device of claim 8, wherein the first reflecting surface, the second reflecting surface, and the third reflecting surface of the focusing optic are arranged to form an Offner relay.

10. The optical guide device of claim 8, wherein the first reflecting surface is formed on a first mirror and the third reflecting surface is formed on a third mirror separate from the first mirror.

11. The optical guide device of claim 8, wherein the first reflecting surface and the third reflecting surface are disposed on a common substrate; and
   one or more of the first reflecting surface and the third reflecting surface is a freeform surface.

12. The optical guide device of claim 8, wherein the first reflecting surface and the third reflecting surface are both portions of a single continuous freeform reflecting surface formed on a first mirror.

13. The optical guide device of claim 12, wherein the second reflecting surface is formed on a secondary mirror separate from the first mirror.

14. The optical guide device of claim 13, wherein one or more of the first reflecting surface and the third reflecting surface is a freeform surface.

15. The optical guide device of claim 1, further comprising a field corrector that is disposed downstream in the optical path from the first prism and the focusing optic.

16. The optical guide device of claim 15, wherein the field corrector is a reflective-type field corrector.

17. The optical guide device of claim 16, wherein the field corrector comprises a freeform surface.

18. The optical guide device of claim 1, wherein the freeform prism surface comprises at least one of a cylindrical surface, an acylindrical surface, or a substantially flat surface.

19. A spectrometer configured to form a spectrally resolved image of electromagnetic radiation from a source, the spectrometer comprising:
   a slit configured to receive electromagnetic radiation; and
   the optical guide device of claim 1 positioned downstream in the optical path from the slit.

20. A method of configuring an optical guide device comprising:
   configuring the optical guide device to include a first prism in an optical path;
   configuring the optical guide device to include a focusing optic positioned in the optical path; and
   configuring the first prism to comprise at least one freeform prism surface having at least some degree of cylindrical curvature, and having freeform polynomial terms formed thereon.

21. An optical system comprising:
   an electromagnetic radiation inlet configured to receive electromagnetic radiation from a source; and
   an optical guide device configured to guide electromagnetic radiation along an optical path from the electromagnetic radiation inlet to a focal plane, the optical guide device comprising:
   a first prism positioned in the optical path;
   a focusing optic positioned in the optical path;
   wherein the first prism comprises at least one freeform prism surface having at least some degree of cylindrical curvature, and having freeform polynomial terms formed thereon.

* * * * *